UNITED STATES PATENT OFFICE.

ALANSON SMITH, OF MENDOTA, ILLINOIS.

IMPROVEMENT IN SOAP.

Specification forming part of Letters Patent No. 219,538, dated September 9, 1879; application filed December 20, 1878.

*To all whom it may concern:*

Be it known that I, ALANSON SMITH, of the city of Mendota, in the county of La Salle and State of Illinois, have invented certain new and useful Improvements in the Manufacture of Soaps, of which the following is a specification.

My invention relates to the composition, and its nature will be disclosed by the following description.

The process to effect the product consists in mixing the hereinafter-named well-known elements or ingredients in certain fixed proportions by certain invariable intensities of heat, the slightest variations from which would not accomplish the desired product.

The method of carrying out my invention is as follows: To prepare a small quantity, first take, say, thirty-five (35) pounds of tallow (or any equivalent substitute) and ten (10) pounds of rosin, melt well together, strain, put back into the kettle at a heat of 72° to 73° Fahrenheit; second, introduce lye, two and two-fifths ($2\frac{2}{5}$) gallons, at a strength of 33° to 34° Baumé, stir till the grease all disappears, then raise the heat till the mixture is brought to the consistence of paste; third, take sal-soda and borax, six (6) pounds of the former and one and three-fifths ($1\frac{3}{5}$) pounds of the latter, melt well together and raise to the same heat as the paste, and then introduce the mixture into the above-named paste; fourth, at this step of the process the action of heat is suddenly suspended and the heated mixture allowed to be reduced to a moderate warmth, when, fifth, the following, one-tenth ($\frac{1}{10}$) gallon of each, of alcohol, benzine, turpentine, and ammonia, are introduced into the preceding mixture. Stir well the whole, and remove into the cooling-vat; then, sixth, add sassafras or any other ingredient which will produce an agreeable odor.

The product (soap) is now ready for dividing into bars when sufficiently cool and ready for the market.

It may be readily observed from the foregoing that my improvement in the manufacture of soap is found in the composition set forth.

What I claim, therefore, and desire to secure by Letters Patent of the United States, is—

The herein-described soap, consisting of the following ingredients—viz., tallow, rosin, lye, sal-soda, borax, alcohol, benzine, turpentine, ammonia, and sassafras—all in the proportions set forth, and for the purpose specified.

ALANSON SMITH.

Witnesses:
   ISAAC PARSONS,
   LEWIS N. PARSONS.